United States Patent
Munshi et al.

(10) Patent No.: US 10,372,431 B2
(45) Date of Patent: *Aug. 6, 2019

(54) UNIFIED INTERMEDIATE REPRESENTATION

(71) Applicant: Apple Inc., Cupertino, CA (US)

(72) Inventors: Aaftab Munshi, Los Gatos, CA (US);
Rahul U. Joshi, Sunnyvale, CA (US);
Mon P. Wang, Sunnyvale, CA (US);
Kelvin C. Chiu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/636,200

(22) Filed: Jun. 28, 2017

(65) Prior Publication Data
US 2017/0308364 A1    Oct. 26, 2017

Related U.S. Application Data

(63) Continuation of application No. 14/501,873, filed on Sep. 30, 2014, now Pat. No. 9,740,464.
(Continued)

(51) Int. Cl.
*G06F 8/41*    (2018.01)
(52) U.S. Cl.
CPC .................. *G06F 8/47* (2013.01); *G06F 8/41* (2013.01); *G06F 8/44* (2013.01); *G06F 8/456* (2013.01)
(58) Field of Classification Search
CPC ..... G06F 8/47; G06F 8/41; G06F 8/44; G06F 8/456
(Continued)

(56) References Cited

U.S. PATENT DOCUMENTS

| 5,179,702 A | 1/1993 | Spix |
| 5,313,614 A | 5/1994 | Goettelmann |

(Continued)

FOREIGN PATENT DOCUMENTS

| CN | 103262038 A | 8/2013 |
| CN | 103392171 A | 11/2013 |
| WO | 2012082423 | 6/2012 |

OTHER PUBLICATIONS

Miranda et al., "Erbium: A Deterministic, Concurrent Intermediate Representation for Portable and Scalable Performance", [Online], 2010, pp. 119-120, [Retrieved from internet on Mar. 13, 2019], <http://delivery.acm.org/10.1145/1790000/1787312/p119-miranda.pdf?ip=151.207.250.61&id=1787312&acc=ACTIVE%2> (Year: 2010).*

(Continued)

*Primary Examiner* — Ziaul A Chowdhury
*Assistant Examiner* — Zengpu Wei
(74) *Attorney, Agent, or Firm* — Blank Rome LLP

(57) ABSTRACT

A system decouples the source code language from the eventual execution environment by compiling the source code language into a unified intermediate representation that conforms to a language model allowing both parallel graphical operations and parallel general-purpose computational operations. The intermediate representation may then be distributed to end-user computers, where an embedded compiler can compile the intermediate representation into an executable binary targeted for the CPUs and GPUs available in that end-user device. The intermediate representation is sufficient to define both graphics and non-graphics compute kernels and shaders. At install-time or later, the intermediate representation file may be compiled for the specific target hardware of the given end-user computing system. The CPU or other host device in the given computing system may compile the intermediate representation file to generate an
(Continued)

instruction set architecture binary for the hardware target, such as a GPU, within the system.

20 Claims, 6 Drawing Sheets

Related U.S. Application Data

(60) Provisional application No. 62/005,632, filed on May 30, 2014.

(58) Field of Classification Search
USPC .......................................................... 717/147
See application file for complete search history.

(56) References Cited

U.S. PATENT DOCUMENTS

| | | | |
|---|---|---|---|
| 5,724,590 | A | 3/1998 | Goettelmann |
| 6,058,438 | A | 5/2000 | Diehl |
| 6,665,688 | B1 | 12/2003 | Callahan, II |
| 7,173,623 | B2 | 2/2007 | Calkins |
| 7,434,213 | B1* | 10/2008 | Prakash ............... G06F 8/41 717/152 |
| 7,659,901 | B2 | 2/2010 | Toelle |
| 7,746,347 | B1 | 6/2010 | Brown |
| 7,800,620 | B2 | 9/2010 | Tarditi, Jr. |
| 8,044,951 | B1 | 10/2011 | Brown |
| 8,149,242 | B2 | 4/2012 | Langyel et al. |
| 8,274,517 | B2 | 9/2012 | Boyd |
| 8,477,143 | B2 | 7/2013 | Harper |
| 8,566,537 | B2 | 10/2013 | Ni |
| 8,595,701 | B2 | 11/2013 | Li |
| 2001/0047510 | A1* | 11/2001 | Angel .................. G06F 11/3612 717/128 |
| 2003/0056083 | A1 | 3/2003 | Bates |
| 2004/0160446 | A1 | 8/2004 | Gosalia |
| 2005/0122330 | A1 | 6/2005 | Boyd |
| 2005/0237330 | A1 | 10/2005 | Stauffer |
| 2006/0012604 | A1 | 1/2006 | Seetharamaiah |
| 2006/0080677 | A1 | 4/2006 | Louie |
| 2006/0098018 | A1 | 5/2006 | Tarditi |
| 2007/0033572 | A1* | 2/2007 | Donovan ................ G06F 8/47 717/106 |
| 2007/0294666 | A1* | 12/2007 | Papakipos ............... G06F 8/20 717/119 |
| 2008/0001952 | A1 | 1/2008 | Srinivasan |
| 2008/0303833 | A1 | 12/2008 | Swift |
| 2009/0125894 | A1* | 5/2009 | Nair ..................... G06F 8/443 717/156 |
| 2009/0217249 | A1* | 8/2009 | Kim ..................... G06F 8/41 717/135 |
| 2009/0284535 | A1 | 11/2009 | Pelton |
| 2009/0307699 | A1 | 12/2009 | Munshi |
| 2010/0277486 | A1 | 11/2010 | Bhoovaraghavan |
| 2011/0004827 | A1 | 1/2011 | Doerr |
| 2011/0063296 | A1 | 3/2011 | Bolz |
| 2011/0087864 | A1 | 4/2011 | Duluk |
| 2011/0246973 | A1* | 10/2011 | Meijer .................. G06F 8/427 717/140 |
| 2011/0314444 | A1* | 12/2011 | Zhang .................. G06F 8/45 717/106 |
| 2011/0314458 | A1* | 12/2011 | Zhu ..................... G06F 8/314 717/149 |
| 2012/0131545 | A1 | 5/2012 | Linebarger |
| 2012/0147021 | A1 | 6/2012 | Cheng |
| 2012/0242672 | A1 | 9/2012 | Larson |
| 2013/0007703 | A1 | 1/2013 | Auerbach |
| 2013/0141443 | A1* | 6/2013 | Schmit .................. G06F 8/41 345/505 |
| 2013/0159630 | A1 | 6/2013 | Lichmanov |
| 2013/0169642 | A1 | 7/2013 | Frascati |
| 2013/0187935 | A1 | 7/2013 | Wexler |
| 2013/0198494 | A1 | 8/2013 | Grover |
| 2014/0040855 | A1 | 2/2014 | Wang |
| 2014/0053161 | A1 | 2/2014 | Sadowski |
| 2014/0337321 | A1 | 11/2014 | Coyote |
| 2014/0354658 | A1 | 12/2014 | Dotsenko |
| 2014/0362093 | A1 | 12/2014 | Lorach |
| 2015/0109293 | A1 | 4/2015 | Wang |
| 2015/0179142 | A1 | 6/2015 | Lehtinen |
| 2015/0221059 | A1 | 8/2015 | Baker |
| 2015/0310578 | A1 | 10/2015 | You |
| 2016/0291942 | A1* | 10/2016 | Hutchison ............... G06F 8/451 |
| 2016/0350245 | A1 | 12/2016 | Shen |

OTHER PUBLICATIONS

McDonnel et al., "Towards Utilizing GPUs in Information Visualization: A Model and Implementation of Image-Space Operations", [Online], 2009, pp. 1105-1112, [Retrieved from internet on Mar. 13, 2019], <https://ieeexplore.ieee.org/stamp/stamp.jsp?tp=&arnumber=5290718> (Year: 2009).*

Foley et al., "Spark: Modular, Composable Shaders for Graphics Hardware", [Online], 2011, pp. 107:1-107:12, [Retrieved from internet on Mar. 13, 2019], <http://www.cs.cmu.edu/afs/cs.cmu.edu/academic/class/15869-f11/www/readings/foley11_spark.pdf> (Year: 2011).*

Holk, Eric et al.; "GPU Programming in Rust: Implementing High-Level Abstractions in a Systems-Level Language"; IEEE International Symposium on Parallel & Distributed Processing, Workshops and PhD Forum; May 20, 2013; pp. 315-324.

"Metal Programming Guide Contents," Mar. 9, 2015 (Mar. 9, 2015), pp. 1-74, XP055207633, Retrieved from the Internet: URL: https://developer.apple.com/library/ios/documentation/Miscellaneous/Conceptual/MetalProgrammingGuide/MetalProgrammingGuide.pdf [retrieved on Aug. 13, 2015].

Chris Lattner, "LLVM & LLVM Bitcode Introduction," Jan. 1, 2013 (Jan. 1, 2013), XP055206788, Retrieved from the Internet: URL: http://pllab.cs.nthu.edu.tw/cs240402/lectures/lectures_2013/LLVM Bitcode Introduction.pdf [retrived on Aug. 7, 2015].

Helge Rhodin, "A PTX Code Generator for LLVM," Oct. 29, 2010 (Oct. 29, 2010), pp. 1-63, XP055208570, Saarbrucken, Germany, Retrieved from the Internet: URL: http://compilers.cs.uni-saarland.de/publications/theses/rhodin_bsc.pdf [retrieved on Aug. 19, 2015].

Ivan Nevraev: "Introduction to Direct3D 12", Apr. 4, 2014 (Apr. 4, 2014), pp. 1-43, XP55203398, Retrieved from the Internet: URL:http://www.google.de/url?sa=t&rct=j&q=&esrc=s&source=web&cd=2&cad=rja&uact=8&ved=0CDEQFjABahUKEwiCmsP_w-hGAhUKPhQKHcqZAP8&url=http%3A%2F%2Famd-dev.wpengine.netdna-cdn.com%2Fwordpress%2Fmedia%2F2012%2F10%2FIntroduction-To-DX12-Ivan-Nevraev.

Kuan-Hsu Chen et al, "An automatic superword vectorization in LLVM," 2010, In 16th Workshop on Compiler Techniques for High-Performance and Embedded Computing, pp. 19-27, Taipei, 2010.

Lattner, Chris, "The Architecture of Open Source Applications: Elegance, Evolution, and a Few Fearless Hacks: LLVM," Mar. 2011, Retrieved from the Internet: URL: http://www.aosabook.org/en/llvm.html [retrieved on Apr. 7, 2014].

LLVM Language Reference Manual, LLVM Project, Apr. 7, 2014, Retrieved from the Internet: URL: http://llvm.org/docs/LangRef.html [retrieved on Apr. 7, 2014].

Matt Sandy: "DirectX 12", Mar. 20, 2014 (Mar. 20, 2014), XP002742458, Retrieved from the Internet: URL: http://blogs.msdn.com/b/directx/archive/2014/03/20/directx-12.aspx [retrieved on Jul. 20, 2015].

OpenGL Reference Manual, The Official Reference Document for OpenGL, Release 1, 1994, pp. 1-257.

Shih-Wei Liao, "Android RenderScript on LLVM," Apr. 7, 2011 (Apr. 7, 2011), XP055206785, Retrieved from the Internet: URL: https://events.linuxfoundation.org/slides/2011/lfcs/lfcs2011_llvm_liao.pdf [retrieved on Aug. 7, 2015].

First Office Action received in Chinese Patent Application No. 201580028375.1, dated May 14, 2018.

Office Action received in European Patent Application No. 15727811.0, dated Mar. 29, 2018.

(56) References Cited

OTHER PUBLICATIONS

Office Action received in European Patent Application No. 15730892.5, dated Jun. 8, 2018.

* cited by examiner

UNIFIED INTERMEDIATE REPRESENTATION

CROSS-REFERENCE TO RELATED APPLICATIONS

This application is a continuation of U.S. patent application Ser. No. 14/501,873, entitled "Unified Intermediate Representation," filed Sep. 30, 2014, which claims priority to U.S. Provisional Patent Application No. 62/005,632, entitled "Unified Intermediate Representation," filed May 30, 2014, both of which are incorporated herein in their entireties.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

This disclosure relates generally to the field of computer programming. More particularly, but not by way of limitation, it relates to techniques for programming graphics and general-purpose parallel computational applications that can be compiled into a common intermediate representation that can be further compiled to execute on a variety of graphical and computational processors.

Computers and other computational devices typically have at least one programmable processing element that is generally known as a central processing unit (CPU). They frequently also have other programmable processors that are used for specialized processing of various types, such as graphics processing operations, hence are typically called graphics processing units (GPUs). GPUs generally comprise multiple cores or processing elements designed for executing the same instruction on parallel data streams, making them more effective than general-purpose CPUs for algorithms in which processing of large blocks of data is done in parallel. In general, a CPU functions as the host and hands-off specialized parallel tasks to the GPUs.

Although GPUs were originally developed for rendering graphics and remain heavily used for that purpose, current GPUs support a programming paradigm that allows using the GPUs as general-purpose parallel processing units in addition to being used as graphics processors. This paradigm allows implementation of algorithms unrelated to rendering graphics by giving access to GPU computing hardware in a more generic, non-graphics-oriented way.

Several frameworks have been developed for heterogeneous computing platforms that have CPUs and GPUs. These frameworks include the Metal framework from Apple Inc., although other frameworks are in use in the industry. Some frameworks focus on using the GPU for general computing tasks, allowing any application to use the GPUs parallel processing functionality for more than graphics applications. Other frameworks focus on using the GPU for graphics processing and provides APIs for rendering two-dimensional (2D) and three-dimensional (3D) graphics. The Metal framework supports GPU-accelerated advanced 3D graphics rendering and data-parallel computation workloads.

The Metal and other frameworks offer a C-like development environment in which users can create applications to run on various different types of CPUs, GPUs, digital signal processors (DSPs), and other processors. Some frameworks also provide a compiler and a runtime environment in which code can be compiled and executed within a heterogeneous computing system. When using some frameworks, developers can use a single, unified language to target all of the processors currently in use. This is done by presenting the developer with an abstract platform model and application programming interface (API) that conceptualizes all of these architectures in a similar way, as well as an execution model supporting data and task parallelism across heterogeneous architectures. Metal has a corresponding shading language to describe both graphics shader and compute functions, which can be compiled during build time and then loaded at runtime. Metal also supports runtime compilation of Metal shading language code.

Tasks may be offloaded from a host (e.g., CPU) to any available GPU in the computer system. Using Metal or other frameworks, programmers can write programs that will run on any GPU for which a vendor has provided corresponding framework-specific drivers. When a Metal or other framework program is executed, a series of API calls configure the system for execution, an embedded compiler compiles the Metal or other framework code, and the runtime asynchronously coordinates execution between parallel kernels and shaders. Applications may use functionality of multiple frameworks, sharing data between the framework-specific portions of the application. Because the developer may not know the actual CPU or GPU that will execute the application, the developer cannot compile the source code into a pure binary for the end-user device.

A typical framework-based system takes source code and run it through an embedded compiler on the end-user system to generate executable code for a target GPU available on that system. Then, the executable code, or portions of the executable code, are sent to the target GPU and are executed. However, developers would prefer not to have to ship their shaders and kernels as source code, but compile their shaders and kernels offline. In addition, each source code language requires an embedded compiler on the end-user device that can compile that source code language. Therefore, there is a need in the art for an approach for providing software to a source code language-independent runtime environment without exposing the source code used to generate the shader or kernel code.

SUMMARY

A system decouples the source code language from the eventual execution environment by compiling the source code language into a unified intermediate representation and conforms to a language model allowing both parallel graphical operations and parallel general-purpose computational operations. The intermediate representation may then be distributed to end-user computers, where an embedded compiler can compile the intermediate representation into an executable binary targeted for the CPUs and GPUs available in that end-user device. The intermediate representation is sufficient to define both graphics and non-graphics compute kernels and shaders.

At install-time or later, the intermediate representation file may be compiled for the specific target hardware of the given end-user computing system. The CPU or other host device in the given computing system may compile the intermediate representation file to generate an instruction set architecture binary for the hardware target, such as a GPU, within the system.

At runtime, the binary may be opened and one or more kernels and shaders retrieved from the binary. The kernels and shaders may then be stored in memory and an application executing may deliver each kernel and shader for execution to a GPU via a runtime environment.

These and other features and advantages will become apparent to those of ordinary skill in the art in view of the following detailed descriptions of the approaches presented herein.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms of a particular framework's implementation, the techniques described herein are not so limited. In particular, some embodiments may use programming language extensions that allow the developer to control low-level data structures used by kernels and shaders executing on the CPU or GPU without requiring the overhead and performance penalties of a high-level API.

Figure 1:
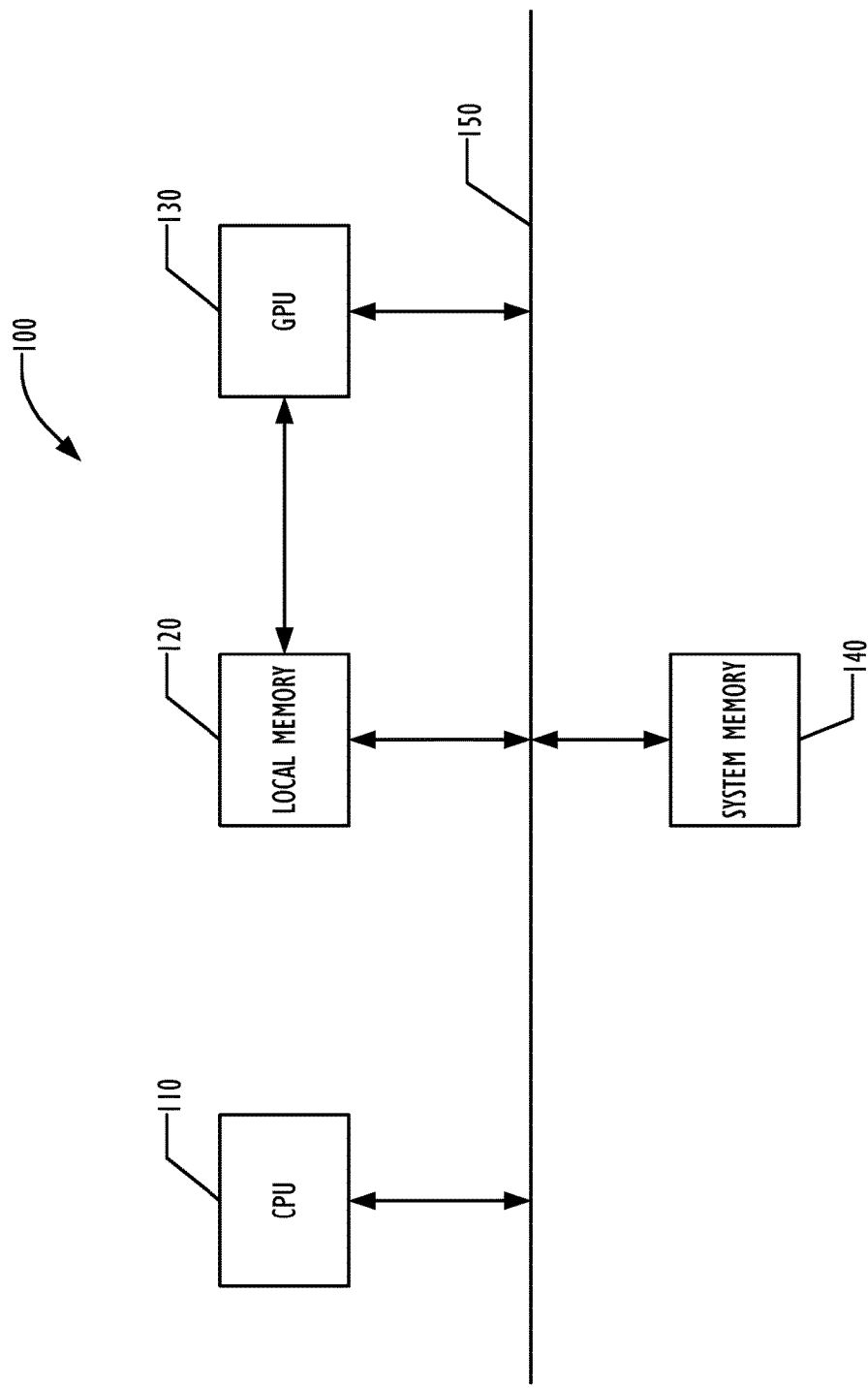
FIG. 1 illustrates, in block diagram form, a computer system for use with the unified intermediate representation according to one embodiment.

Referring now to FIG. 1, a block diagram of a computing system 100 according to one embodiment is shown. Computing system 100 includes a CPU 110, a GPU 130. In the embodiment illustrated in FIG. 1, CPU 110 and GPU 130 are included on separate integrated circuits (ICs) or packages. In other embodiments, however, CPU 110 and GPU 130, or the collective functionality thereof, may be included in a single IC or package.

In addition, computing system 100 also includes a system memory 140 that may be accessed by CPU 110 and GPU 130. In various embodiments, computing system 100 may comprise a supercomputer, a desktop computer, a laptop computer, a video-game console, an embedded device, a handheld device (e.g., a mobile telephone, smart phone, MP3 player, a camera, a GPS device, or other mobile device), or any other device that includes or is configured to include a GPU. Although not illustrated in FIG. 1, computing system 100 may also include conventional elements of a computing system, including a display device (e.g., cathode-ray tube, liquid crystal display, plasma display, etc.) for displaying content (e.g., graphics, video, etc.) of computing system 100, as well as input devices (e.g., keyboard, touch pad, mouse, etc.), storage devices (e.g., hard disc, optical disc, etc.) and communication devices (e.g., network interface). Any other elements may be included as desired. Although illustrated as coupled by a common communication link 150, multiple links 150 may be employed with the CPU 110 and GPU 130 connected to separate but interconnected links 150, as desired.

GPU 130 assists CPU 110 by performing certain special functions, such as graphics-processing tasks and data-parallel, general-compute tasks, usually faster than CPU 110 could perform them in software.

GPU 130 is coupled with CPU 110 and system memory 140 over link 150. Link 150 may be any type of bus or communications fabric used in computer systems, including a peripheral component interface (PCI) bus, an accelerated graphics port (AGP) bus, a PCI Express (PCIE) bus, or another type of link, including non-bus links. If multiple links 150 are employed, they may be of different types.

In addition to system memory 140, computing system 100 may include a local memory 120 that is coupled to GPU 130, as well as to link 150. Local memory 120 is available to GPU 130 to provide access to certain data (such as data that is frequently used) faster than would be possible if the data were stored in system memory 140. Local memory 120 may also be available to CPU 110 to provide access to data such as binaries stored in the local memory 120. In some embodiments, separate local memories may be use for the CPU 110 and GPU 130, instead of sharing a common local memory 120.

Although a single CPU 110 and GPU 130 are illustrated in FIG. 1, embodiments may employ any number of CPUs 110 and GPUs 130 as desired. Where multiple CPUs 110 or GPUs 130 are employed, each of the CPUs 110 and GPUs 130 may be of different types and architectures. In addition, the computer system 100 may employ one or more specialized co-processor devices (not illustrated in FIG. 1), such as cryptographic co-processors, which may be coupled to one or more of the CPUs 110 and GPUs 130, using the link 150 or other links as desired.

Figure 2:
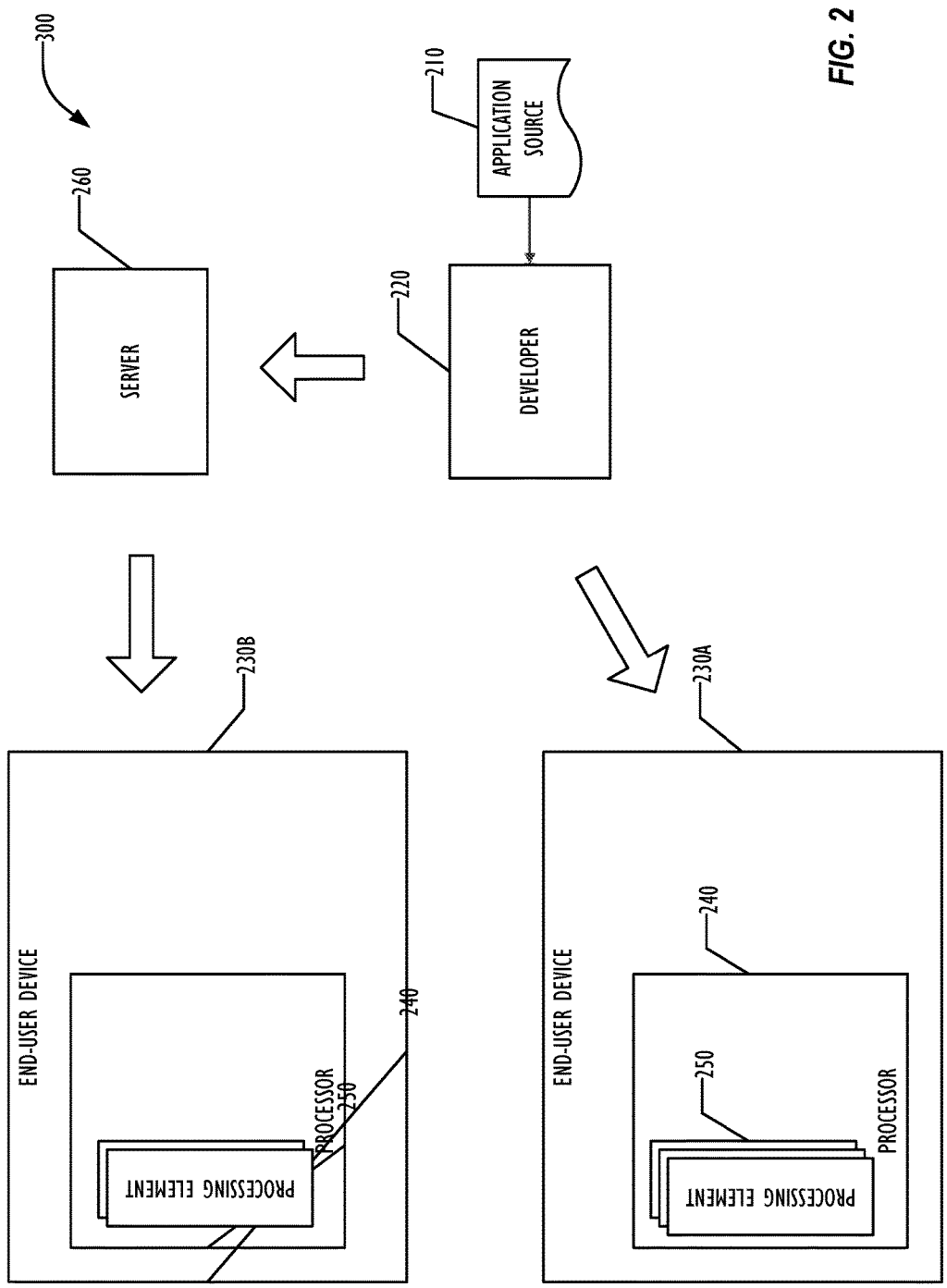
FIG. 2 illustrates, in block diagram form, a developer system and a collection of end-user devices for use with a unified intermediate representation according to one embodiment.

Turning now to FIG. 2, a block diagram illustrates one embodiment of a distributed computing environment.

Host application 210 may be programmed to execute on any of end-user devices 230A/230B. The source code for application 210 is compiled on developer system 220 into a form (described in more detail below) that can be executed on either of end-user device 230A or 230B, even though end-user device 230A contains multiple processors 240, each of which has multiple parallel processing elements 250, while end-user device 230B contains only a single processor 240 with a different number of parallel processing elements 250. In this embodiment, the processors 240 on which the application 210 eventually executes may have different architectures and operating characteristics. The processors 240 may be any desired type of processor, e.g., CPUs, GPUs, field programmable gate arrays, or application-specific integrated circuits, as long as an appropriate driver is available for that type of processor 240. Although only two end-user devices 230A/B are illustrated in FIG. 2 for clarity, any number of end user devices 230 may be used, each of which may have any number of processors 240, and any number of parallel processing elements 250.

The developer device 220 may also include one or more processors (not shown in FIG. 2), which may be the same as or different from the processors 240 on which the application 210 is intended to operate. The developer device 220 may be coupled to each of end-user devices 230A/B via various types of connections, including direct connections, bus connections, local area network (LAN) connections, internet connections, and the like. Alternately, a physical medium may be used for transport between the developer system 220 and the end-user devices 230A/B. In another alternative, the distribution of the software from the developer system 220 to the end-user devices 230A/B may be through an intermediate distribution server 260 such as a cloud server. End-user devices such as end-user device 230B may request the software from the intermediate distribution server 260; alternately, the intermediate distribution server 260 may push the software to the end-user device 230B. Where the developer is a third-party providing applications to an application store hosted by the server 260, the operator of the application store may test the application software before allowing its distribution from the server 260 for compliance with policies and standards defined for the application store, including verification that the application does not constitute or contain malware.

The application program 210 when run on end-user devices 230A/B may include Metal kernels and shaders as well as other kernels and shaders. As used herein, the terms "kernel" and "shader" refers to functions declared in a program that executes on a target device (e.g., GPU) within a framework such as Metal. The source code for the kernel or shader may be written in the Clang, C, C++, or any other language capable of expressing the structures and functions of the framework. The source code is compiled into an intermediate representation on the developer system 220, then distributed to the end-user devices 230A/B, where the intermediate representation is compiled to create an executable form of the kernel or shader that can run on the processing elements 250. In some embodiments, the kernels and shaders to be executed by an end-user device 230A/B may be broken up into a plurality of workloads, and workloads may be issued to different processing elements 250 in parallel.

Figure 3:
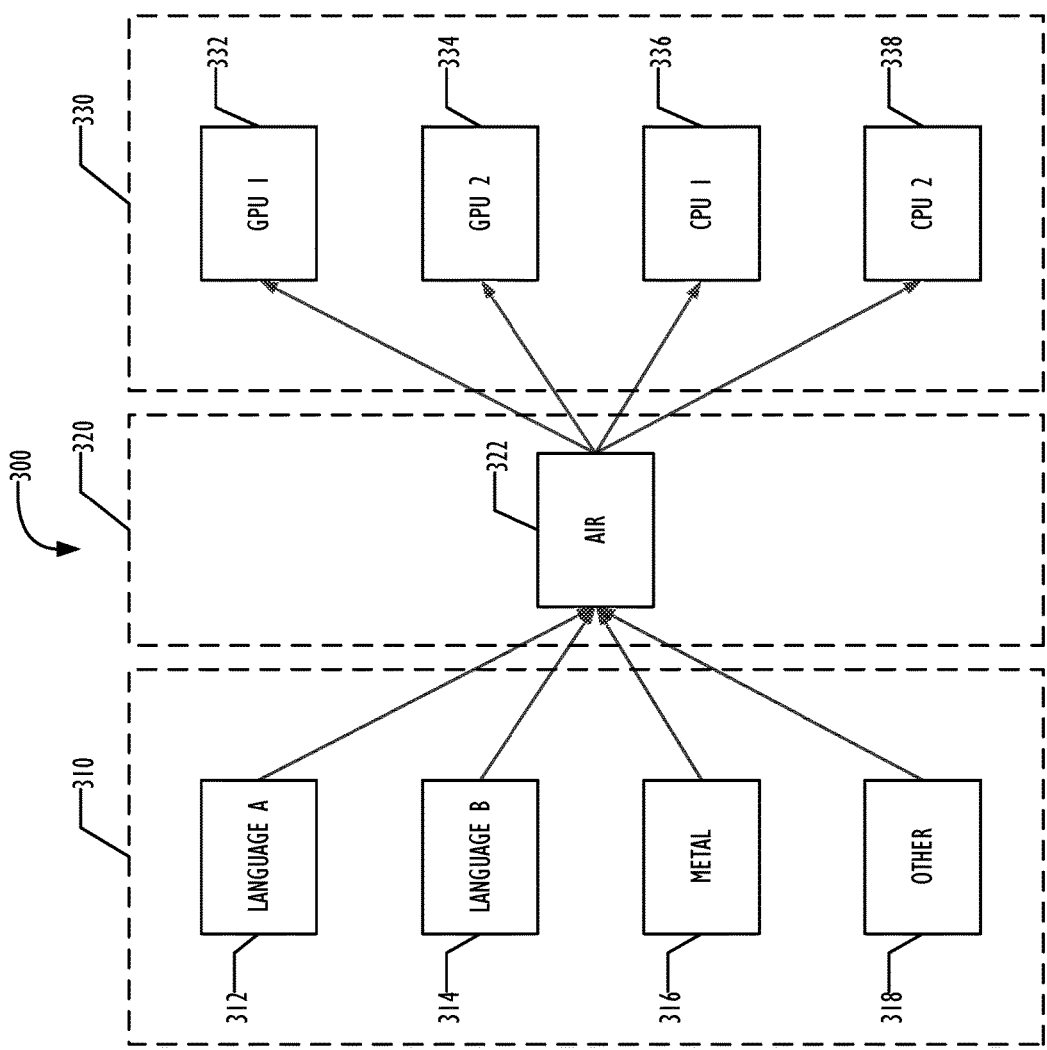
FIG. 3 illustrates, in block diagram form, a multi-phase compiler system employing a unified intermediate representation according to one embodiment.

Referring now to FIG. 3, a block diagram illustrates an embodiment of a three-phase compiler system 300 according to one embodiment. The compiler system 300 is a three-phase design whose major components are the front end 310, the optimizer 320, and the back end 330. The front end parses source code, checking it for errors, and builds a language-specific Abstract Syntax Tree (AST) to represent the source code. The AST is converted to an intermediate representation for optimization in the optimizer 320, and the back end 330 uses the intermediate representation to produce an executable binary.

The optimizer 320 is responsible for doing a broad variety of transformations to try to improve the code's running time, such as eliminating redundant computations, and is largely independent of language and target. The back end 330 (also known as the code generator) then maps the code onto the target instruction set. In addition to making correct code, the back end 330 is responsible for generating good code that takes advantage of unusual features of the supported architecture. Common parts of a compiler back end include instruction selection, register allocation, and instruction scheduling. An industry standard for three phase compiler systems has been the LLVM system (LLVM originally referred to "low level virtual machine," but currently is simply an initialism, because LLVM technology is not limited to virtual machines). One advantage of the LLVM three-phase compiler system is that the backend phase 330 may be separated from the front end 310 and the optimizer phase 320 so that each phase may be performed on a different computer. In some embodiments discussed below, the backend phase 330 is performed on the end-user computer, while the front-end phase 310 and the optimizer phase 320 are performed on a developer computer. Thus, the developer may ship the optimized IR 322 produced by the optimizer 320 to the end-user for installation and execution by an embedded backend phase 330, producing the executable without exposing source code to the end user computer.

As illustrated in FIG. 3, front-end phase 310 may be configured to allow multiple source languages, such as Language A 312, Language B 314, Metal 316, or any other language 318 to be compiled into the IR and optimized by the optimizer 320. In some embodiments, separate front-end phases 310 are provided for each source code language; in other embodiments, a single front-end phase 310 may be used to compile multiple source code languages into the IR 322.

By separating out the back end phase 330, different back end phases may be provided for different processors. Thus, the common IR 322 may be processed into executable code for GPU 1 (332), GPU 2 (334), CPU 1 (336), or CPU 2 (338), depending on the back end phase 330 employed. This decoupling of source code from the target processor allows development of a new source code language, such as described below, while reusing the existing optimizer phase 320 and back-end phase 330. Similarly, employment of a new type of GPU or CPU may be accomplished by providing a new back end phase 330 that processes the IR 322 for the new target CPU or GPU, without requiring changes to the front end 310 or optimizer 320.

Figure 4:
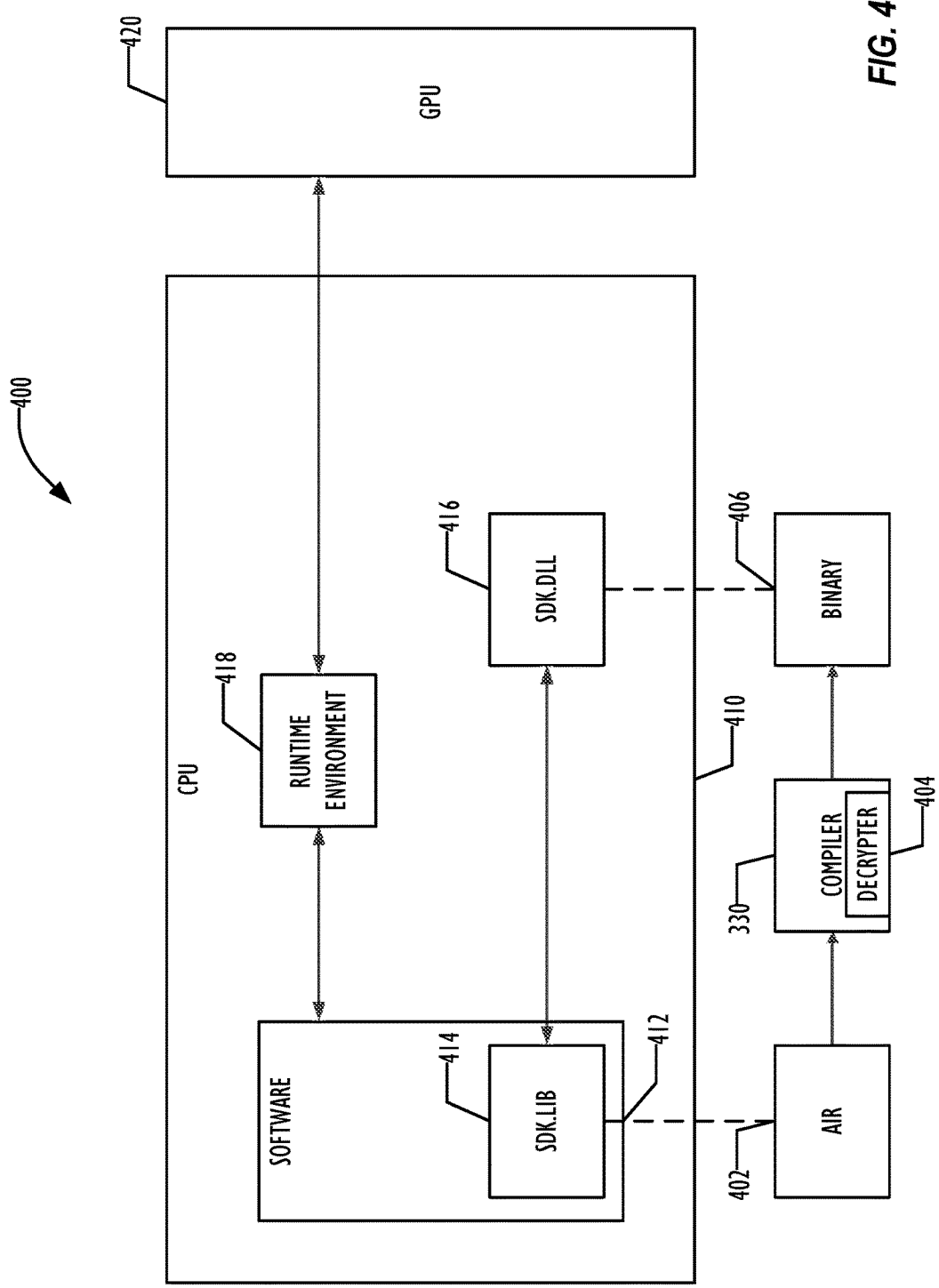
FIG. 4 illustrates, in block diagram form, a computer system and technique for creating an executable binary from an intermediate representation file according to one embodiment.

Referring now to FIG. 4, a block diagram illustrates one embodiment 400 of a runtime environment on an end-user device 230A/B that implements a back end phase 330. A software library 412 comprising code to perform a certain type of processing (e.g., video editing, media processing, graphics processing) may be obtained by the end-user device 230 A/B, for example downloaded or included in an installation package distributed from the developer system 220 or an intermediate computing system. The software library 412 was compiled from source code in some source code language (e.g., Metal, Objective C, etc.) to a device-independent intermediate representation file prior to being included in the installation package. The intermediate representation file 402 conforms to a language model defining the intermediate representation (IR). In one embodiment, the IR language model may be an extension of an LLVM IR language model, such as the AIR language model described in more detail below. Distributing the AIR file 402 instead of the source code may prevent unintended access or modification of the original source code.

The AIR file 402 may be included in the installation package for various types of end-user computing systems. In one embodiment, at install-time, the AIR file 402 may be compiled by a backend compiler phase 330 executing on a CPU 410 of the end-user device into a binary 406. In some embodiments, the embedded compiler backend phase 330 may generate another intermediate language (IL) file from the AIR file 402 before generating the binary code 406 from the IL file. The embedded backend compiler 330 may include technical details that are specific to the target devices (e.g., the GPUs 420).

The device-specific binary 406 may be cached by the CPU 410 or otherwise made accessible for later use. The compiler 330 used to generate binary 406 from the AIR file 402 may be provided to CPU 410 as part of a driver pack for the GPU 420. As used herein, the term "binary" refers to a compiled, executable version of the software, typically structured as a library of kernels and shaders. Binary file 406 may be targeted to a specific target device, such as the GPU 420, and kernels and shaders may be retrieved from the binary and executed by the GPU 420. In some embodiments, at least some of the kernels and shaders may be executed by the CPU 410. Where multiple CPUs 410 or GPUs 420 are present in the end-user device, they may be of different types, and the kernels and shaders from a binary file 406 compiled for a first target device may not be executable on a second target device. Binary file 406 may also be called an instruction set architecture (ISA) binary.

The device-specific binary file 406 may include a plurality of executable kernels and shaders. The kernels and shaders may already be in a compiled, executable form such that they may be transferred to the GPU 420 and executed without having to go through a just-in-time (JIT) compile stage. When a specific kernel or shader is accessed by software application 412 the specific kernel or shader may be retrieved from or stored in memory. Therefore, for future accesses of the same kernel or shader, the kernel or shader may be retrieved from memory instead of being retrieved from binary file 406. In another embodiment, the kernel or shader may be stored in memory within GPU 420 so that the kernel or shader can be quickly accessed the next time the kernel or shader is executed.

A software development kit (SDK) library (.lib) file, SDK.lib 414, may be utilized by software application 412 to provide access to binary 406 via a dynamic-link library, SDK.dll 416. SDK.dll 416 may be utilized to access binary file 406 from software application 412 at runtime, and SDK.dll 416 may be distributed to end-user computing systems along with the AIR file 402. Software application 412 may utilize SDK.lib 414 to access binary file 406 via SDK.dll 426 by making the appropriate application programming interface (API) calls.

The SDK.lib 414 may include a plurality of functions for accessing the kernels and shaders in binary file 406. These functions may include an open function, get program function, and a close function. The open function may open binary 406 and load a master index table from binary file 406 into memory within CPU 410. The get program function may select a single kernel or shader from the master index table and copy the kernel or shader from binary file 406 into memory for the CPU 410. The close function may release resources used by the open function.

In some embodiments, when the open function is called, software application 412 may determine if binary file 406 has been compiled with the latest driver. If a new driver has been installed by CPU 410 and if binary file 406 was compiled by a compiler from a previous driver, then the original AIR file 402 may be recompiled with the new compiler to create a new binary file 406. In one embodiment, only the individual kernel or shader that has been invoked may be recompiled. In another embodiment, the entire library of kernels and shaders may be recompiled. In a further embodiment, the recompilation may not occur at runtime. Instead, an installer may recognize all of the binaries stored in CPU 410, and when a new driver is installed, the installer may recompile the AIR file 402 in the background when the CPU 410 is not busy.

In one embodiment, the CPU 410 may operate a runtime environment 418, such as an Metal runtime environment, that operates between the application 412 and the GPU 420. In such an embodiment, the software application 412 may include an API, such as an Metal API, for accessing the Metal runtime environment 418.

In some embodiments, the AIR file 402 may be generated as an unencrypted AIR file, then encrypted before distribution to the end-user devices 230A/B. Distributing encrypted AIR files 402 to end-users may provide extra protection of source code for the application 210 and may prevent an unauthorized user from reverse engineering the AIR file 402 to generate an approximation of the source code for the application 210. Creating and distributing encrypted AIR files 402 may be an option that is available for certain libraries and certain installation packages. For example, the software developer of application 210 may decide to use encryption to provide extra protection for their source code, while the developer of a different application may choose not to use encryption.

When encryption is utilized, the backend compiler 330 may include an embedded decrypter 404, which is configured to decrypt encrypted AIR files. The compiler 330 may decrypt the encrypted AIR file 402 and then perform the compilation to create unencrypted binary file 406, which may be stored in for later use in a local memory (not shown) of the CPU 410. In another embodiment, the unencrypted binary file 406 may be stored in another memory (not shown) external to CPU 410. In some embodiments, the AIR file 402 may incorporate an indicator whether the AIR file 402 is encrypted.

Figure 5:
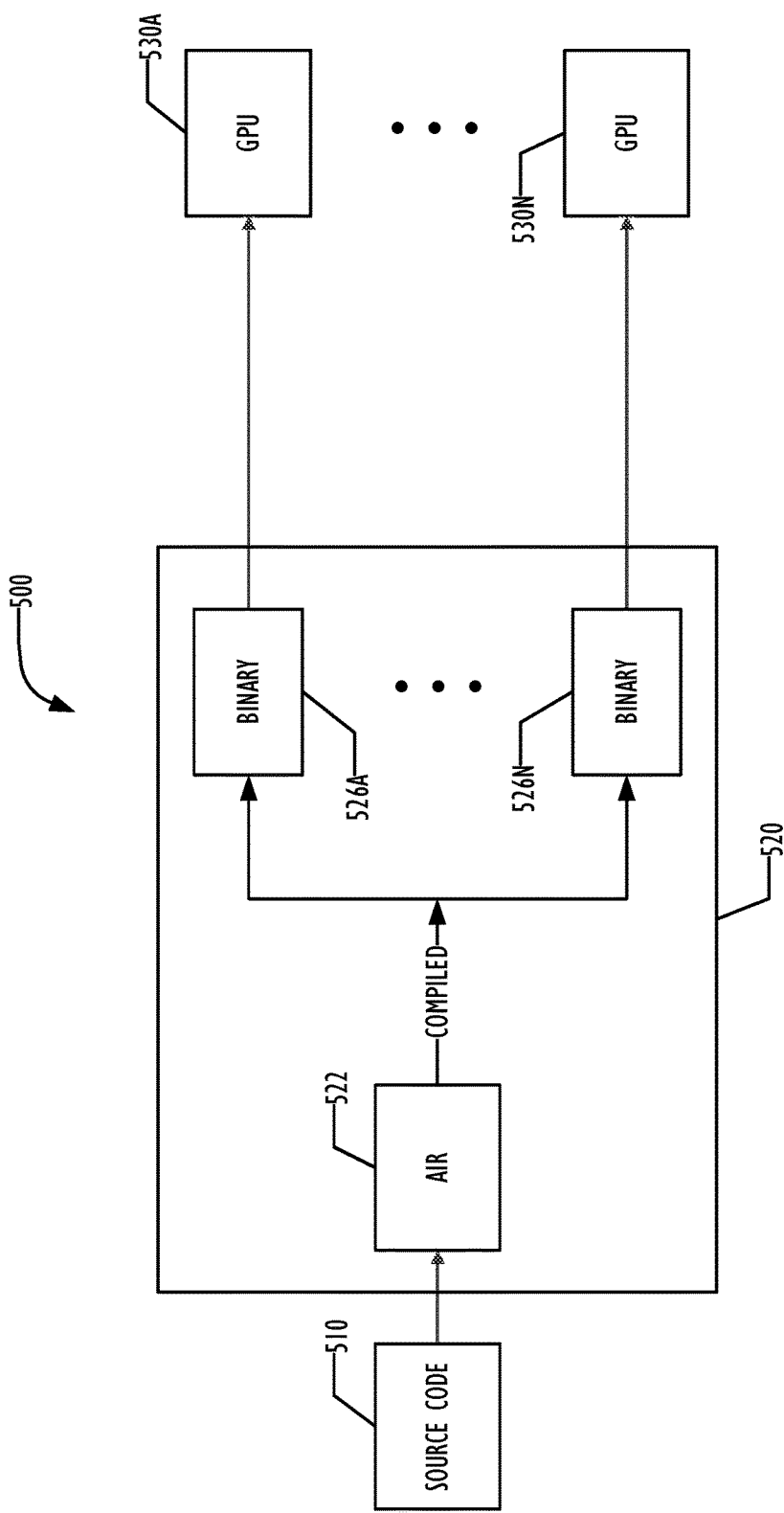
FIG. 5 illustrates, in block diagram form, a computer system and technique for creating executable binaries from an intermediate representation file according to one embodiment.

Referring now to FIG. 5, a block diagram of one embodiment of a portion of another computing system is shown. Source code 510 may represent any number of libraries and kernels and shaders that may be utilized by system 500. In one embodiment, source code 510 may be compiled into AIR 522. AIR 522 may be the same for GPUs 530A-N. In one embodiment, AIR 522 may be compiled by separate compilers into binaries 526A-N. A first compiler (not shown) executing on CPU 520 may compile the AIR 522 into a binary 526A. Binary 526A may be targeted to GPU 530A, which may have a first type of micro-architecture. Similarly, a second compiler (not shown) executing on CPU 520 may compile the same AIR 522 into binary 526N. Binary 526N may be targeted to GPU 530N, which may have a second type of micro-architecture different from the first type of micro-architecture of GPU 530A.

Binaries 526A-N are representative of any number of binaries that may be generated and GPUs 530A-N are representative of any number of GPUs that may be included in the computing system 500. Binaries 526A-N may also include any number of kernels and shaders, and different kernels and shaders from source code 510 may be included within different binaries. For example, source code 510 may include a plurality of kernels and shaders. A first kernel or shader may be intended for execution on GPU 530A, and so the first kernel or shader may be compiled into binary 526A which targets GPU 530A. A second kernel or shader from source code 510 may be intended for execution on GPU 530N, and so the second kernel or shader may be compiled into binary 526N which targets GPU 530N. This process may be repeated such that any number of kernels and shaders may be included within binary 526A and any number of kernels and shaders may be included within binary 526N. Some kernels and shaders from source code 510 may be compiled and included into both binaries, some kernels and shaders may be compiled into only binary 526A, other kernels and shaders may be compiled into only binary 526N, and other kernels and shaders may not be included into either binary 526A or binary 526N. This process may be repeated for any number of binaries, and each binary may contain a subset or the entirety of kernels and shaders originating from source code 510. In other embodiments, other types of devices (e.g., FPGAs, ASICs) may be utilized within computing system 500 and may be targeted by one or more of binaries 526A-N.

Although FIG. 5 shows a single source code 510 and a single AIR 522, multiple source code files 510 may be compiled to produce multiple AIR files or modules 522, which may then be linked into a single library of shaders or kernels. The application may then load this library of AIR code and compile the shaders and kernels that it desires to use to the GPU executable binary 526.

Figure 6:
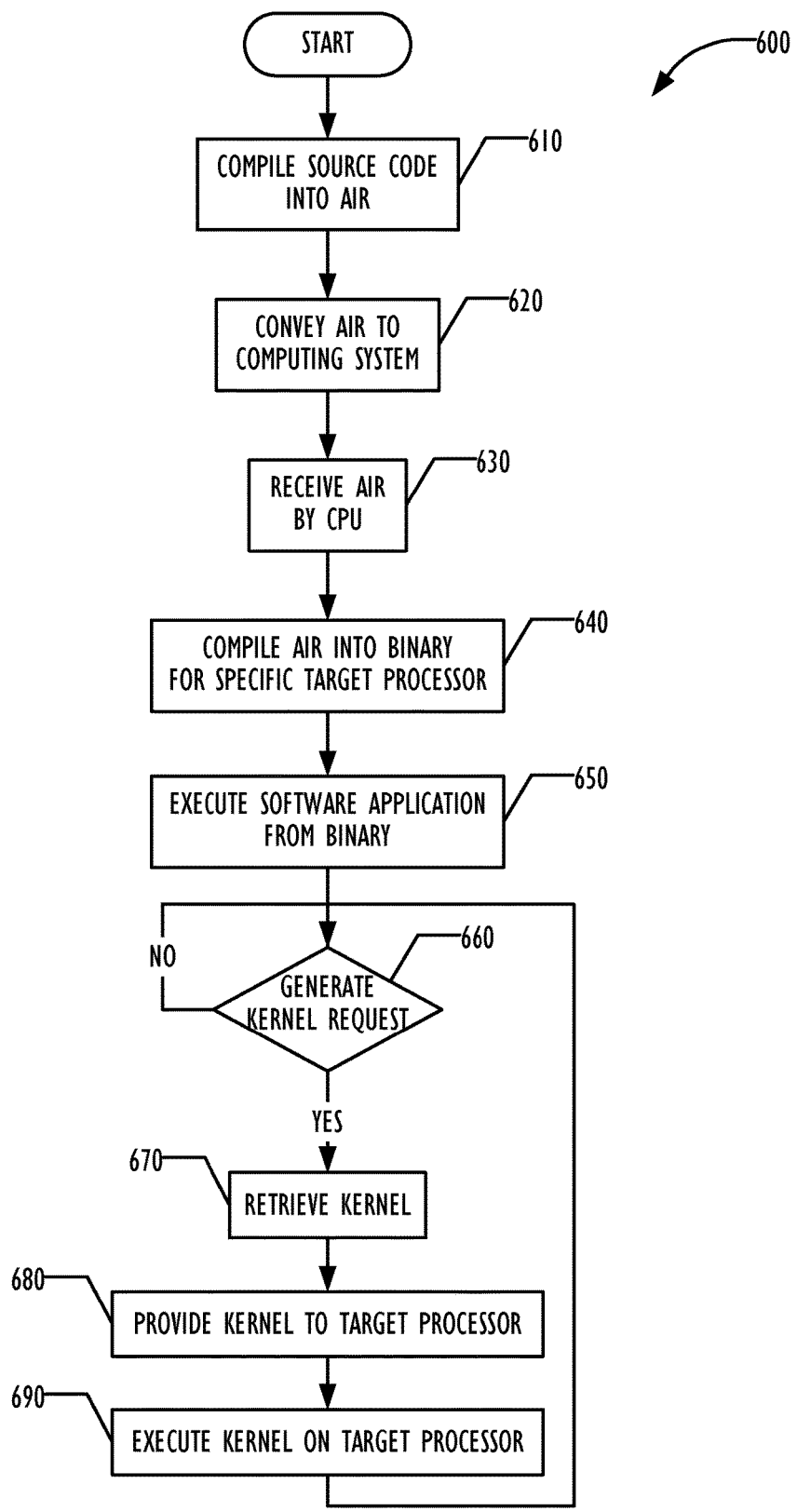
FIG. 6 illustrates, in flowchart form, a technique for generating and using a unified intermediate representation according to one embodiment.

Turning now to FIG. 6, a flowchart illustrates one embodiment of a technique for providing a library using an intermediate representation. Although as illustrated in FIG. 6, the steps in this embodiment are shown in sequential order, other embodiments may perform one or more of the blocks concurrently, in a different order than illustrated, or may omit a block. Other additional elements may also be performed as desired.

Technique 600 may start in block 610 by compiling the source code of a library into the AIR. In one embodiment, the source code may be written in Metal. In other embodiments, the source code may be written in other languages. In one embodiment, the AIR IR may be an extension of an LLVM IR as described below. In block 620, the AIR file 402 may be conveyed to a computing system 100, typically an end-user computing system. The conveyance may be performed electronically via any form of communication, wireless or wired, or may be performed physically by storing the AIR file 402 on a physical medium. Although written herein as "a medium" the person of skill in the art will recognize that multiple physical media may be employed as needed, together forming a medium for transmitting the AIR 402. Any desired format may be used for storing the AIR file 402 on the physical medium. As illustrated in FIG. 1, the computing system 100 may include a plurality of processors, including one or more CPUs 110 and one or more GPUs 130. The computing system may download the AIR file 402, the AIR file 402 may be part of an installation software package, or any of various other methods for conveying the AIR file 402 to the computing system 100 may be utilized. An intermediate cloud server may be used for intermediate storage and retrieval of the AIR file 402 for delivery to the computer system 100.

The AIR file 402 may be received by a host processor of the computing system in block 630. In one embodiment, the host processor may be a CPU 110. In other embodiments, the host processor may be a digital signal processor (DSP), system on chip (SoC), microprocessor, GPU, or the like. In block 640, the AIR file 402 may be compiled into a binary file 406 by a compiler executing on the CPU. The binary file 406 may be targeted to a specific target processor (e.g., GPU 130) within the computing system 100. Alternatively, the binary file 406 may be targeted to a device or processor external to the computing system. The binary file 406 may include a plurality of kernels and shaders, wherein each of the kernels and shaders is directly executable on the specific target processor. In some embodiments, the kernels and shaders may be functions that take advantage of the parallel processing ability of a GPU 130 or other device with a parallel architecture. The binary file 406 may be stored within a CPU local memory, system memory, or in another storage location, such as a storage device connected to the CPU 110. Referring to binary file 406 as a "file" should not be interpreted as implying any specific file format, organization, or manner of storage.

As with FIG. 5, FIG. 6 illustrates for clarity a single source code file that is compiled into a single AIR file 402, which is then compiled into a binary file 406. Implementations may provide for linking multiple AIR files 402 into a library of shaders and kernels, from which desired kernels and shaders may then be loaded by an application to create the GPU executable binary 406.

In one embodiment, the CPU may execute a software application in block 650, and the software application may interact with a runtime environment (e.g., an Metal environment) to schedule specific tasks to be performed by one or more target processors. In other embodiments, the application may provide its own runtime environment. To perform these tasks, the software application may invoke calls to one or more functions corresponding to kernels and shaders from the binary file 406. When the function call executes, a request for the kernel or shader may be generated by the application in block 660. Responsive to generating a request for a kernel or shader, the application may invoke one or more API calls to retrieve the kernel or shader from the binary file 406 in block 670. In embodiments where kernels and shaders are stored apart from the binary file 406, such as by being cached in memory, the kernel or shader may be retrieved from the appropriate storage location without accessing the binary file 406.

If a request for a kernel or shader is not generated in block 660, then the software application may continue with its execution and may be ready to respond when a request for a kernel or shader is generated. After the kernel or shader has been retrieved from the binary file 406 in block 670, the kernel or shader may be provided to the specific target processor in block 680. The kernel or shader may be provided to the specific target processor in a variety of manners, including as a string or in a buffer. Then, the kernel or shader may be executed by the specific target processor in block 690. After completion of block 690 or in parallel with execution of the kernel or shader, the software application may continue to be executed on the CPU until another request for a kernel or shader is generated in block 660. Steps 610-640 may be repeated a plurality of times for any plurality of libraries that are utilized by the computing system. While the target processor for execution of kernels and shaders commonly is a GPU, kernels and shaders may also be executed on CPUs or on a combination of GPUs, CPUs, and other devices as desired.

The AIR file 402 contains instructions that conform to an AIR language model that is an extension of the LLVM IR described in various LLVM documentation. AIR and the LLVM IR are Static Single Assignment (SSA)-based representations. AIR has been designed in three different forms: an in-memory compiler IR, an on-disk bitcode representation suitable for fast loading by a loader or JIT compiler, and as a human-readable language representation. The following is a high-level description of the human readable representation. A backend compiler 330 for AIR typically provides a verification pass to verify that the AIR file 402 is well formed.

The LLVM IR is solely capable of describing computational kernels and shaders, and the LLVM IR does not provide any representations of functions necessary for performing graphical operations on a GPU. The AIR language model is a unified IR language model that incorporates some or all of the functionality of the LLVM IR language model, but includes instructions for parallel graphical operations as well as parallel general-purpose computational operations. In some embodiments, only a subset of the LLVM IR intrinsics is supported.

In one embodiment, AIR functions are designated in human-readable form with an @air. prefix to distinguish them from LLVM functions. The functions supported by some embodiments of the AIR language model include the general groups listed in Table 1 below:

TABLE 1

Function Type:

Math Functions
Conversion Functions
Pack/Unpack Functions
Integer Functions
Common and Geometric Functions
Vector Data Load and Store Functions
Texture Functions (Single Precision Floating Point Color Values)
Texture Functions (Half-Precision Floating Point Color Values)
Texture Query Functions
Compute Functions
Work-Group Functions
Sub-Group Functions
Graphics Functions
Atomic Functions
Miscellaneous Functions
Named Metadata
Uniforms
GLSL Vertex Functions
GLSL Geometry Functions
GLSL Fragment Functions
GLSL Subroutines
Compute Functions
Other Vertex Fetch Functions
Other Vertex Functions
Other Fragment Functions
Other Compute Functions For example, the following is an example texture function that uses single precision floating point color values for sampling from a depth texture in one dimension:

```
declare T
@air.sample_depth_1d.f32(
    %struct._depth_1d_t addrspace(1) * %tex,
    %struct._sampler_t addrspace(2) * %smp,
    i32 %depth_format,
    float %coord,
    i1 %offset_en, i32 %offset,
    i1 %lod_or_bias, float %lod_or_bias_value)
declare T
```

-continued

```
@air.sample_depth_1d_grad.f32(
    %struct._depth_1d_t addrspace(1) * %tex,
    %struct._sampler_t addrspace(2) * %smp,
    i32 %depth_format,
    float %coord,
    float %dPdx, float %dPdy,
    i1 %offset_en, i32 %offset)
```

In another example, the following is a texture query function that queries the texture width:

```
declare i32
@air.get_width_texture_buffer_1d(
    %struct._texture_buffer_1d_t addrspace(1) * %tex)
```

In yet another example, the following functions match the precision and range requirements defined by some frameworks with fast relaxed math:

declare T@air.fast_a cos.type(T % x)
declare T@air.fast_a cos h.type(T % x)
declare T@air.fast_a sin.type(T % x)
declare T@air.fast_a sin h.type(T % x)

The AIR language model and the compilation of source code into an AIR file 402 provides developers with a way to compile their source code for both graphical and general-purpose computational software in such a way that the source code does not need to be delivered to the end-user device, only the AIR file 402. Furthermore, because the backend portion of compilation can be performed at install or later on the end-user device, the same AIR file 402 may be provided for execution to different GPUs or CPUs that are capable of parallel processing, including GPUs or CPUs that are developed after the source code has been compiled into AIR. In addition, because the AIR language model is source code language independent, different compiler front ends may be developed that generate AIR files 402, allowing vendors or developers to develop fronts ends for other source code languages without changing the AIR processing in the optimizer or backend compilations steps.

Program instructions and/or a database that represent and embody the described techniques and mechanisms may be stored on a machine-readable storage medium. The program instructions may include machine-readable instructions that when executed by the machine, cause the machine to perform the actions of the techniques described herein.

A machine-readable storage medium may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

In other embodiments, the program instructions that represent the described techniques and mechanisms may be a behavioral-level description or register-transfer level (RTL) description of hardware functionality in a hardware design language (HDL) such as Verilog or VHDL. The description may be read by a synthesis tool that may synthesize the description to produce a netlist comprising a list of gates from a synthesis library. The netlist comprises a set of gates that also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the database on the computer accessible storage medium may be the netlist (with or without the synthesis library) or the data set, as desired. While a computer accessible storage medium may carry a representation of a system, other embodiments may carry a representation of any portion of a system, as desired, including an IC, any set of programs (e.g., API, DLL, or compiler), or portions of programs.

Types of hardware components, processors, or machines that may be used by or in conjunction with various embodiments include ASICs, FPGAs, microprocessors, or any integrated circuit. Such processors may be manufactured by configuring a manufacturing process using the results of processed HDL instructions (such instructions capable of being stored on a computer readable medium). The results of such processing may be mask works that are then used in a semiconductor manufacturing process to manufacture a processor that implements aspects of the methods and mechanisms described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A non-transitory machine-readable medium, on which are stored instructions, comprising instructions that when executed cause a machine to:
   receive a pre-compiled library, wherein the pre-compiled library is a post-compilation intermediate representation of code, the intermediate representation of code being suitable for a subsequent compilation into machine language for a plurality of different processing devices, and wherein the pre-compiled library comprises both graphics operations and non-graphics operations;
   compile at least a portion of the pre-compiled library from the intermediate representation into a first binary file comprising both one or more kernels and one or more shaders that are directly executable by a first target processor;
   compile at least a portion of the pre-compiled library from the intermediate representation into a second binary file comprising both one or more kernels and one or more shaders that are directly executable by a second target processor, which is different from the first target processor,
   wherein at least a first kernel from the first binary file and at least a second kernel from the second binary file are each based upon the compilation of a same first portion of the pre-compiled library, and wherein at least a first shader from the first binary file and at least a second shader from the second binary file are each based upon the compilation of a same second portion of the pre-compiled library;
   responsive to detecting a request for the first kernel, retrieve the first kernel from the first binary file for execution by the first target processor; and
   responsive to detecting a request for the second kernel, retrieve the second kernel from the second binary file for execution by the second target processor.

2. The non-transitory machine-readable medium of claim 1, wherein the intermediate representation of code contains instructions conforming to an intermediate representation language model, wherein the intermediate representation language model is independent of the first target processor and the second target processor.

3. The non-transitory machine-readable medium of claim 1, wherein the intermediate representation of code contains instructions conforming to an intermediate representation language model, wherein the intermediate representation language model is independent of the source code from which the intermediate representation of code was pre-compiled.

4. The non-transitory machine-readable medium of claim 1, wherein the instructions further cause the machine to:
   responsive to detecting a request for the first shader, retrieve the first shader from the first binary file for execution by the first target processor; and
   responsive to detecting a request for the second shader, retrieve the second shader from the second binary file for execution by the second target processor.

5. The non-transitory machine-readable medium of claim 1, wherein the instructions further cause the machine to provide the first kernel to the first target processor for execution and to provide the second kernel to the second target processor for execution.

6. The non-transitory machine-readable medium of claim 1, wherein:
   a first compiler is used to compile the at least a portion of the pre-compiled library from the intermediate representation into the first binary file; and
   a second complier is used to compile the at least a portion of the pre-compiled library from the intermediate representation into the second binary file.

7. The non-transitory machine-readable medium of claim 1, wherein the intermediate representation of code contains instructions conforming to an intermediate representation language model, wherein the intermediate representation language model contains functions for performing parallel graphics operations and functions for performing parallel non-graphics operations.

8. A method comprising:
   receiving a pre-compiled library, wherein the pre-compiled library is a post-compilation intermediate representation of code, the intermediate representation of code being suitable for a subsequent compilation into machine language for a plurality of different processing devices, and wherein the pre-compiled library comprises both graphics operations and non-graphics operations;
   compiling at least a portion of the pre-compiled library from the intermediate representation into a first binary file comprising both one or more kernels and one or more shaders that are directly executable by a first target processor;

compiling at least a portion of the pre-compiled library from the intermediate representation into a second binary file comprising both one or more kernels and one or more shaders that are directly executable by a second target processor, which is different from the first target processor, wherein at least a first kernel from the first binary file and at least a second kernel from the second binary file are each based upon the compilation of a same first portion of the pre-compiled library, wherein at least a first shader from the first binary file and at least a second shader from the second binary file are each based upon the compilation of a same second portion of the pre-compiled library;

responsive to detecting a request for the first kernel, retrieving the first kernel from the first binary file for execution by the first target processor; and responsive to detecting a request for the second kernel, retrieving the second kernel from the second binary file for execution by the second target processor.

9. The method of claim 8, wherein the intermediate representation of code contains instructions conforming to an intermediate representation language model, wherein the intermediate representation language model is independent of the first target processor and the second target processor.

10. The method of claim 8, wherein the intermediate representation of code contains instructions conforming to an intermediate representation language model, wherein the intermediate representation language model is independent of the source code from which the intermediate representation of code was pre-compiled.

11. The method of claim 8, further comprising:
responsive to detecting a request for the first shader, retrieving the first shader from the first binary file for execution by the first target processor; and
responsive to detecting a request for the second shader, retrieving the second shader from the second binary file for execution by the second target processor.

12. The method of claim 8, wherein:
a first compiler is used to compile the at least a portion of the pre-compiled library from the intermediate representation into the first binary file; and
a second complier is used to compile the at least a portion of the pre-compiled library from the intermediate representation into the second binary file.

13. The method of claim 8, wherein the intermediate representation of code contains instructions conforming to an intermediate representation language model, wherein the intermediate representation language model contains functions for performing parallel graphics operations and functions for performing parallel non-graphics operations.

14. A system for processing graphics comprising:
a CPU;
a memory associated with the CPU for holding instructions for the CPU;
a first target GPU and a second target GPU for producing graphics, wherein the instructions for the CPU, when executed cause the production of graphics by:
receiving a pre-compiled library, wherein the pre-compiled library is a post-compilation intermediate representation of code, the intermediate representation of code being suitable for a subsequent compilation into machine language for a plurality of different processing devices, and wherein the pre-compiled library comprises both graphics operations and non-graphics operations;

compiling at least a portion of the pre-compiled library from the intermediate representation into a first binary file comprising both one or more kernels and one or more shaders that are directly executable by a first target processor;

compiling at least a portion of the pre-compiled library from the intermediate representation into a second binary file comprising both one or more kernels and one or more shaders that are directly executable by a second target processor, which is different from the first target processor, wherein at least a first kernel from the first binary file and at least a second kernel from the second binary file are each based upon the compilation of a same first portion of the pre-compiled library, wherein at least a first shader from the first binary file and at least a second shader from the second binary file are each based upon the compilation of a same second portion of the pre-compiled library;

responsive to detecting a request for the first kernel, retrieving the first kernel from the first binary file for execution by the first target processor; and responsive to detecting a request for the second kernel, retrieving the second kernel from the second binary file for execution by the second target processor.

15. The system of claim 14, wherein the intermediate representation of code contains instructions conforming to an intermediate representation language model, wherein the intermediate representation language model is independent of the first target processor and the second target processor.

16. The system of claim 14, wherein the intermediate representation of code contains instructions conforming to an intermediate representation language model, wherein the intermediate representation language model is independent of the source code from which the intermediate representation of code was pre-compiled.

17. The system of claim 14, wherein the instructions for the CPU, when executed further cause the production of graphics by:
responsive to detecting a request for the first shader, retrieving the first shader from the first binary file for execution by the first target processor; and
responsive to detecting a request for the second shader, retrieving the second shader from the second binary file for execution by the second target processor.

18. The system of claim 14, wherein:
a first compiler is used to compile the at least a portion of the pre-compiled library from the intermediate representation into the first binary file; and
a second complier is used to compile the at least a portion of the pre-compiled library from the intermediate representation into the second binary file.

19. The system of claim 14, wherein the instructions for the CPU, when executed further cause the production of graphics by providing the first kernel to the first target processor for execution and by providing the second kernel to the second target processor for execution.

20. The system of claim 14, wherein the intermediate representation of code contains instructions conforming to an intermediate representation language model, wherein the intermediate representation language model contains functions for performing parallel graphics operations and functions for performing parallel non-graphics operations.

* * * * *